(12) United States Patent
Gallaher

(10) Patent No.: US 10,099,626 B1
(45) Date of Patent: Oct. 16, 2018

(54) GARMENT HANGING DEVICE

(71) Applicant: Michael Gallaher, San Pablo, CA (US)

(72) Inventor: Michael Gallaher, San Pablo, CA (US)

( * ) Notice: Subject to any disclaimer, the term of this patent is extended or adjusted under 35 U.S.C. 154(b) by 0 days.

(21) Appl. No.: 15/473,012

(22) Filed: Mar. 29, 2017

(51) Int. Cl.
*A47G 25/00* (2006.01)
*B60R 7/00* (2006.01)
*B60R 7/10* (2006.01)

(52) U.S. Cl.
CPC ...................... *B60R 7/10* (2013.01)

(58) Field of Classification Search
CPC .. B60R 7/00; B60R 7/10; A47G 25/00; A47G 25/06
USPC .......................... 224/313, 547, 556
See application file for complete search history.

(56) References Cited

U.S. PATENT DOCUMENTS

| D128,287 | S |   | 7/1941  | Lauronen |         |
|----------|---|---|---------|----------|---------|
| 2,344,339 | A |   | 3/1944  | Zwald    |         |
| 2,598,643 | A |   | 5/1952  | Kaplan et al. | |
| 2,706,049 | A | * | 4/1955  | Andrews  | B60R 7/10 |
|          |   |   |         |          | 211/104 |
| 3,941,250 | A | * | 3/1976  | Ott      | A47G 25/0685 |
|          |   |   |         |          | 211/1.3 |
| 4,171,748 | A | * | 10/1979 | Fabian   | A47G 25/0685 |
|          |   |   |         |          | 211/1.3 |
| 4,632,255 | A | * | 12/1986 | Kennedy  | A47G 25/0685 |
|          |   |   |         |          | 211/1.3 |
| 4,778,089 | A |   | 10/1988 | White et al. | |
| 5,104,083 | A |   | 4/1992  | Shannon  |         |
| 5,328,068 | A |   | 7/1994  | Shannon  |         |
| D394,975 | S | * | 6/1998  | Wilkening | D12/115 |
| 5,890,689 | A |   | 4/1999  | Johnson  |         |
| 7,886,918 | B1 | * | 2/2011 | Sauer    | A47G 25/0685 |
|          |   |   |         |          | 211/99  |

FOREIGN PATENT DOCUMENTS

WO    WO9413512    6/1994

* cited by examiner

*Primary Examiner* — Brian D Nash

(57) ABSTRACT

A garment hanging device for use in a vehicle includes a coupler that is configured to couple to a garment hook of the vehicle. A plate is hingedly coupled to the coupler. The plate is selectively positionable in a stowed configuration, wherein a first edge of the plate is positioned adjacent to the coupler, and a deployed configuration, wherein the first edge is positioned substantially perpendicular to the coupler. A plurality of first slots is positioned in the first edge of the plate. The first slots are configured to insert hook portions of hangers to couple the hangers to the plate. Garments that are positioned on the hangers are suspended from the plate.

8 Claims, 4 Drawing Sheets

GARMENT HANGING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to garment hanging devices and more particularly pertains to a new garment hanging device for use in a vehicle.

BRIEF SUMMARY OF THE INVENTION

An embodiment of the disclosure meets the needs presented above by generally comprising a coupler that is configured to couple to a garment hook of a vehicle. A plate is hingedly coupled to the coupler. The plate is selectively positionable in a stowed configuration, wherein a first edge of the plate is positioned adjacent to the coupler, and a deployed configuration, wherein the first edge is positioned substantially perpendicular to the coupler. A plurality of first slots is positioned in the first edge of the plate. The first slots are configured to insert hook portions of hangers to couple the hangers to the plate. Garments that are positioned on the hangers are suspended from the plate.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
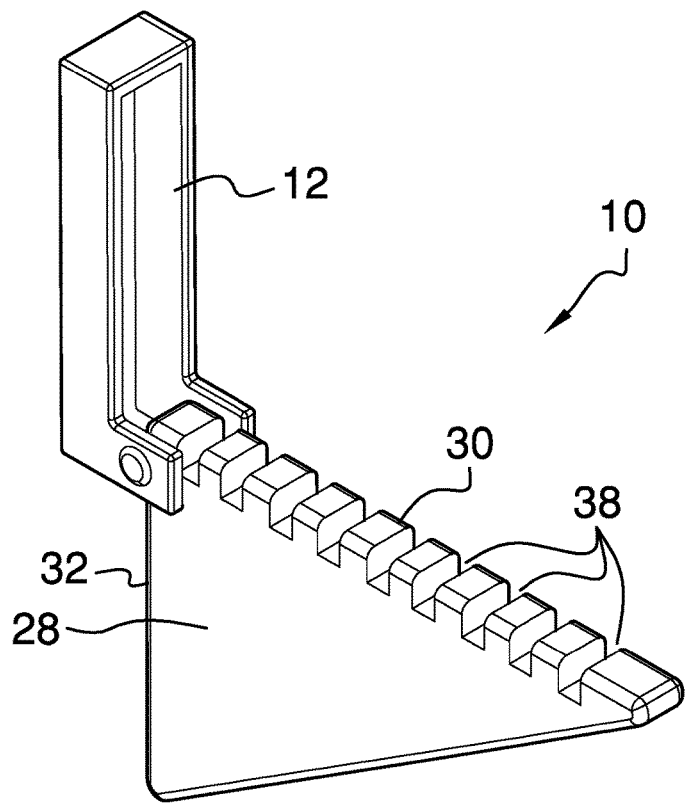
FIG. 1 is an isometric perspective view of a garment hanging device according to an embodiment of the disclosure.
Figure 2:
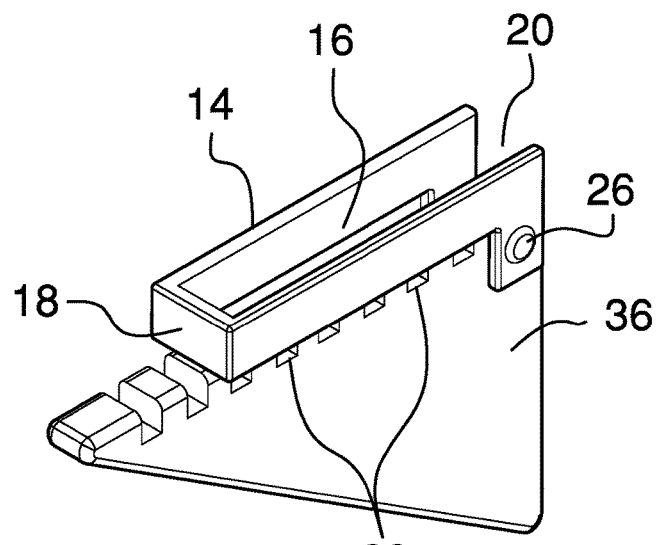
FIG. 2 is an isometric perspective view of an embodiment of the disclosure.
Figure 3:
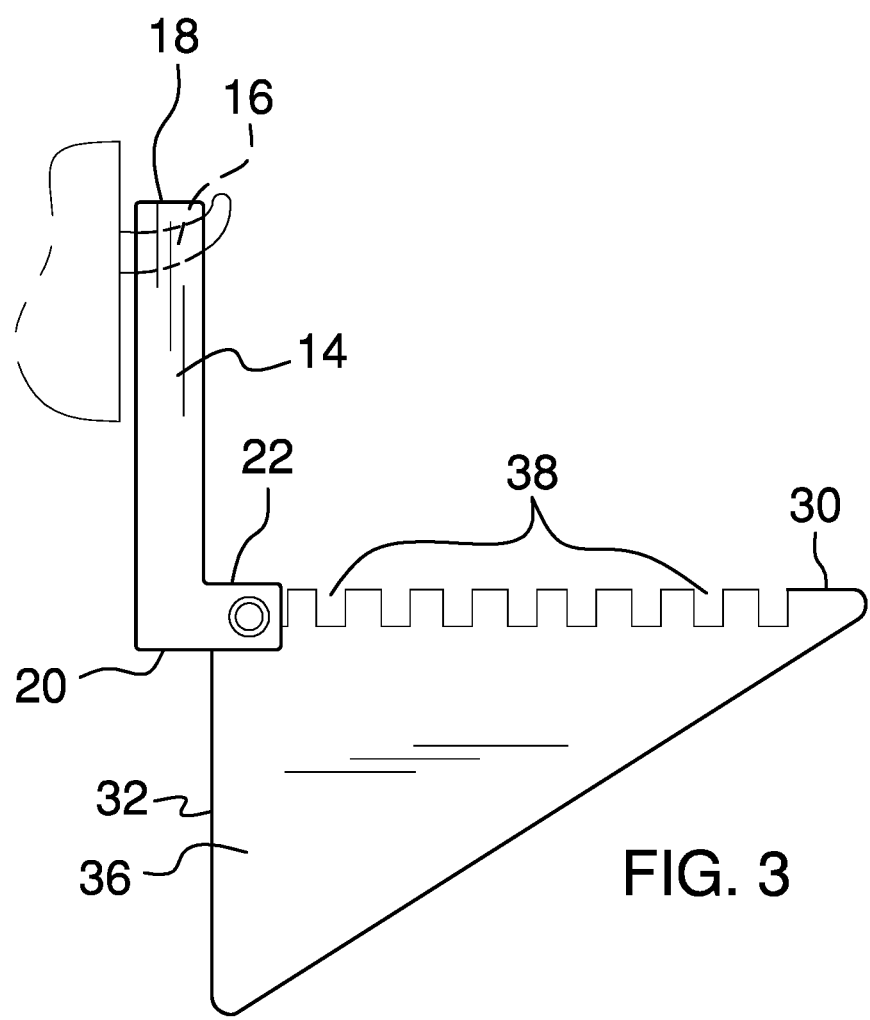
FIG. 3 is a side view of an embodiment of the disclosure.
Figure 4:
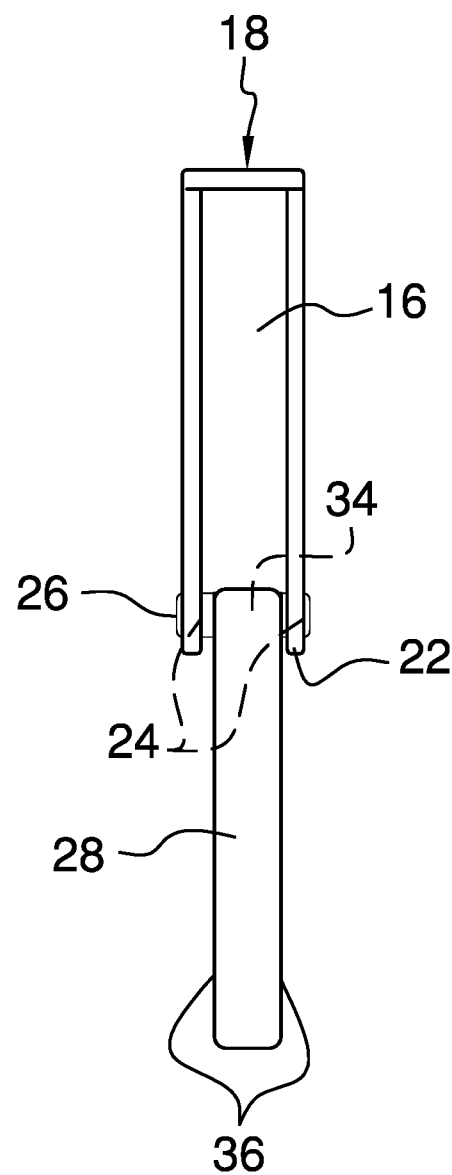
FIG. 4 is an end view of an embodiment of the disclosure.
Figure 5:
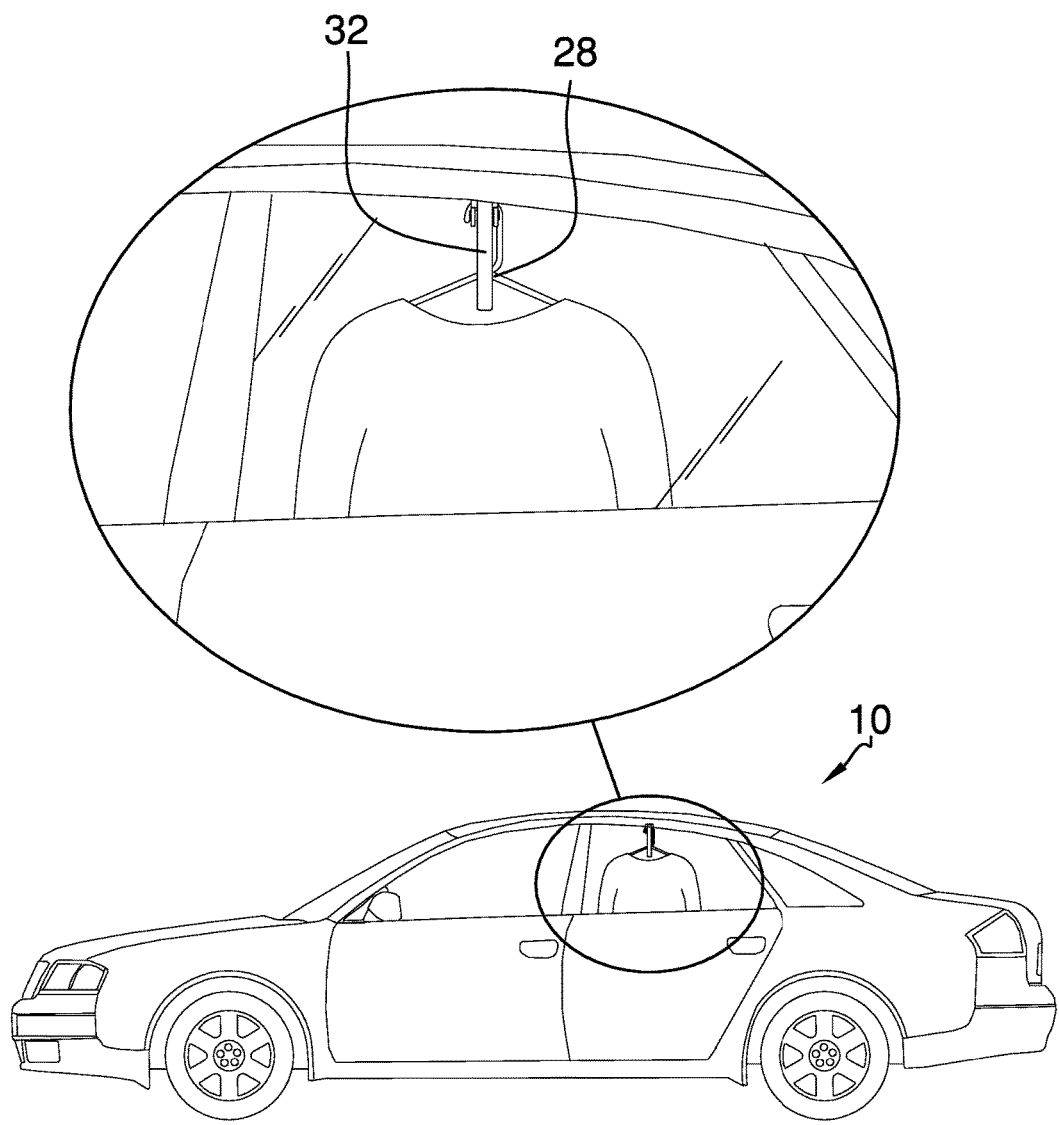
FIG. 5 is an in-use view of an embodiment of the disclosure.

With reference now to the drawings, and in particular to FIGS. 1 through 5 thereof, a new garment hanging device embodying the principles and concepts of an embodiment of the disclosure and generally designated by the reference numeral 10 will be described.

As best illustrated in FIGS. 1 through 5, the garment hanging device 10 generally comprises a coupler 12 that is configured to couple to a garment hook of a vehicle. In one embodiment, the coupler 12 comprises a block 14 that is substantially rectangularly box shaped. A second slot 16 is positioned through the block 14. The second slot 16 extends from proximate to a top 18 to a bottom 20 of the block 14. The second slot 16 is configured to insert the garment hook so that the coupler 12 is coupled to the vehicle. In another embodiment, each of a pair of arms 22 is coupled to and extends from the block 14 proximate to the bottom 20 of the block 14. Each of a pair of holes 24 is positioned through a respective arm 22. The pair of holes 24 are alignably positioned through the pair of arms 22 such that the holes 24 are positioned to insert a pin 26, which is complementary to the holes 24.

A plate 28 is hingedly coupled to the coupler 12. The plate 28 is selectively positionable in a stowed configuration, wherein a first edge 30 of the plate 28 is positioned adjacent to the coupler 12, and a deployed configuration, wherein the first edge 30 is positioned substantially perpendicular to the coupler 12. In one embodiment, the plate 28 is substantially trigonally shaped. A second edge 32 of the plate 28 extends perpendicularly from the first edge 30 proximate to the coupler 12. The second edge 32 of the plate 28 is configured to abut a surface of the vehicle that is proximate to the garment hook, such as a window, when the plate 28 is in the deployed configuration, to support the plate 28 in the deployed configuration.

A channel 34 extends between opposing sides 36 of the plate 28. The channel 34 is positioned proximate to the first edge 30 and the second edge 32 of the plate 28. The channel 34 is complementary to the pin 26. The channel 34 is positioned to align with the pair of holes 24. The holes 24 and the channel 34 are positioned to insert the pin 26 to hingedly couple the plate 28 to the coupler 12.

A plurality of first slots 38 is positioned in the first edge 30 of the plate 28. The first slots 38 are configured to insert hook portions of hangers to couple the hangers to the plate 28. Garments that are positioned on the hangers are suspended from the plate 28. In one embodiment, the first slots 38 are substantially rectangularly shaped. In another embodiment, the plurality of first slots 38 comprises from three to fifteen first slots 38. In yet another embodiment, the plurality of first slots 38 comprises from six to twelve first slots 38. In still yet another embodiment, the plurality of first slots 38 comprises nine first slots 38.

In use, the second slot 16 is configured to insert the garment hook so that the coupler 12 is coupled to the vehicle. The second edge 32 of the plate 28 is configured to abut the surface of the vehicle proximate to the garment hook, such as the window, when the plate 28 is in the deployed configuration, to support the plate 28 in the deployed configuration. The first slots 38 are configured to insert the hook portions of the hangers to couple the hangers to the plate 28. The garments that are positioned on the hangers are suspended from the plate 28.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A garment hanging device comprising:
   a coupler configured for coupling to a garment hook of a vehicle such that said coupler is coupled to the vehicle;
   a plate hingedly coupled to said coupler such that said plate is selectively positionable in a stowed configuration wherein a first edge of said plate is positioned adjacent to said coupler and a deployed configuration wherein said first edge is positioned substantially perpendicular to said coupler;
   a plurality of first slots positioned in said first edge of said plate;
   wherein said first slots are positioned in said plate such that said first slots are configured for inserting hook portions of hangers to couple the hangers to said plate such that garments positioned on the hangers are suspended from said plate; and
   said coupler comprising
     a block, said block being substantially rectangularly box shaped,
     a second slot positioned through said block, said second slot extending from proximate to a top to a bottom of said block; and
   wherein said second slot is positioned in said block such that said second slot is configured for inserting the garment hook such that said coupler is coupled to the vehicle.

2. The device of claim 1, further comprising:
   a pair of arms coupled to and extending from said block proximate to said bottom of said block;
   a pair of holes, each said hole being positioned through a respective said arm such that said pair of holes is alignably positioned through said pair of arms;
   a pin, said pin being complementary to said holes, wherein said holes are positioned in said arms such that said holes are positioned for inserting said pin;
   a channel extending between opposing sides of said plate, said channel being positioned proximate to said first edge and said second edge of said plate, said channel being complementary to said pin; and
   wherein said channel is positioned through said plate such that said channel is positioned for alignably positioning with said pair of holes, such that said holes and said channel are positioned for inserting said pin for hingedly coupling said plate to said coupler.

3. The device of claim 1, further including said first slots being substantially rectangularly shaped.

4. The device of claim 1, further including said plurality of first slots comprising from three to fifteen said first slots.

5. The device of claim 4, further including said plurality of first slots comprising from six to twelve said first slots.

6. The device of claim 5, further including said plurality of first slots comprising nine said first slots.

7. A garment hanging device comprising:
   a coupler configured for coupling to a garment hook of a vehicle such that said coupler is coupled to the vehicle;
   a plate hingedly coupled to said coupler such that said plate is selectively positionable in a stowed configuration wherein a first edge of said plate is positioned adjacent to said coupler and a deployed configuration wherein said first edge is positioned substantially perpendicular to said coupler;
   a plurality of first slots positioned in said first edge of said plate;
   wherein said first slots are positioned in said plate such that said first slots are configured for inserting hook portions of hangers to couple the hangers to said plate such that garments positioned on the hangers are suspended from said plate; and
   said plate being substantially trigonally shaped such that a second edge of said plate extends perpendicularly from said first edge proximate to said coupler, wherein said second edge of said plate is configured for abutting a surface of the vehicle proximate to the garment hook when said plate is in the deployed configuration, for supporting said plate in the deployed configuration.

8. A garment hanging device comprising:
   a coupler configured for coupling to a garment hook of a vehicle such that said coupler is coupled to the vehicle, said coupler comprising:
     a block, said block being substantially rectangularly box shaped,
     a second slot positioned through said block, said second slot extending from proximate to a top to a bottom of said block, wherein said second slot is positioned in said block such that said second slot is configured for inserting the garment hook such that said coupler is coupled to the vehicle,
     a pair of arms coupled to and extending from said block proximate to said bottom of said block, a pair of holes, each said hole being positioned through a respective said arm such that said pair of holes is alignably positioned through said pair of arms, and a pin, said pin being complementary to said holes, wherein said holes are positioned in said arms such that said holes are positioned for inserting said pin;

a plate hingedly coupled to said coupler such that said plate is selectively positionable in a stowed configuration wherein a first edge of said plate is positioned adjacent to said coupler and a deployed configuration wherein said first edge is positioned substantially perpendicular to said coupler, said plate being substantially trigonally shaped such that a second edge of said plate extends perpendicularly from said first edge proximate to said coupler, wherein said second edge of said plate is configured for abutting a surface of the vehicle proximate to the garment hook when said plate is in the deployed configuration, for supporting said plate in the deployed configuration;

a channel extending between opposing sides of said plate, said channel being positioned proximate to said first edge and said second edge of said plate, said channel being complementary to said pin, wherein said channel is positioned through said plate such that said channel is positioned for alignably positioning with said pair of holes, such that said holes and said channel are positioned for inserting said pin for hingedly coupling said plate to said coupler;

a plurality of first slots positioned in said first edge of said plate, wherein said first slots are positioned in said plate such that said first slots are configured for inserting hook portions of hangers to couple the hangers to said plate such that garments positioned on the hangers are suspended from said plate, said first slots being substantially rectangularly shaped, said plurality of first slots comprising from three to fifteen said first slots; and wherein said second slot is positioned in said block such that said second slot is configured for inserting the garment hook such that said coupler is coupled to the vehicle, wherein said second edge of said plate is configured for abutting the surface of the vehicle proximate to the garment hook, such as the window, when said plate is in the deployed configuration, for supporting said plate in the deployed configuration, wherein said first slots are positioned in said plate such that said first slots are configured for inserting the hook portions of the hangers to couple the hangers to said plate such that the garments positioned on the hangers are suspended from said plate.

* * * * *